United States Patent
Bindana et al.

(10) Patent No.: US 11,394,835 B1
(45) Date of Patent: Jul. 19, 2022

(54) METHODS AND SYSTEMS FOR SECURING A PORTABLE STORAGE DEVICE CONNECTED TO A UNIVERSAL SERIAL BUS (USB) PORT OF A MULTI-FUNCTION DEVICE

(71) Applicant: XEROX CORPORATION, Norwalk, CT (US)

(72) Inventors: Srinivasarao Bindana, Kakinada (IN); Dara N Lubin, Pittsford, NY (US); Prasanth Kalaiselvan, Tharangambadi (T.K) (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/554,301

(22) Filed: Dec. 17, 2021

(51) Int. Cl.
*H04N 1/00* (2006.01)
*H04N 1/12* (2006.01)

(52) U.S. Cl.
CPC ......... *H04N 1/00193* (2013.01); *H04N 1/126* (2013.01)

(58) Field of Classification Search
None
See application file for complete search history.

(56) References Cited

U.S. PATENT DOCUMENTS

| 7,704,084 B1* | 4/2010 | Cheng | H01R 13/4538 439/131 |
| 2004/0212966 A1* | 10/2004 | Fisher | H01R 13/453 361/726 |
| 2017/0095040 A1* | 4/2017 | Byrd | A44B 15/005 |

FOREIGN PATENT DOCUMENTS

JP 2015127115 A * 7/2015 ........... H04N 1/2158

OTHER PUBLICATIONS

Mizuno, JP-2015127115-A English Translation, par 0007, 0011-0017, 0084 (Year: 2015).*

* cited by examiner

*Primary Examiner* — Miya J Williams

(57) ABSTRACT

The present disclosure discloses methods and systems for securing a portable storage device connected to a Universal Serial Bus (USB) port of a mufti-function device. The method includes determining if the portable storage device is unattended at the multi-function device for a pre-defined time. Based on the determination, a retraction assembly is activated to secure the portable storage device inside the multi-function device. Once the retraction assembly is activated, the retraction process starts where the portable storage device is retracted to a first position within the multi-function device. Then, the portable storage device is moved from the first position to a second position within the multi-function device. Thereafter, the portable storage device is detached, in the second position, from the USB port to a container of the retraction assembly to secure the portable storage device.

20 Claims, 18 Drawing Sheets

METHODS AND SYSTEMS FOR SECURING A PORTABLE STORAGE DEVICE CONNECTED TO A UNIVERSAL SERIAL BUS (USB) PORT OF A MULTI-FUNCTION DEVICE

TECHNICAL FIELD

The present disclosure relates to portable storage devices, and more particularly, to methods and systems for securing a portable storage device connected to a Universal Serial Bus (USB) port of a mufti-function device.

BACKGROUND

Generally, portable storage devices, such as flash drives, thumb drives, and USB flash drives, are often used for storing and transferring of computer files. The computer files include documents, video, audio, and/or image data. These days, multi-function devices also include a feature that allows users to retrieve documents from the multi-function devices or direct printing from their portable storage devices. To this end, a multi-function device includes a Universal Serial Bus (USB) port for connecting the portable storage device to the multi-function device. For example, a user inserts the portable storage device into the USB port of the multi-function device and prints one or more documents stored in the portable storage device. After completion of the printing, the user collects the printed documents and moves away from the multi-function device for some other work. Sometimes, the user may forget to take back the portable storage device connected to the USB port, thereby leaving the portable storage device unattended at the multi-function device.

Likewise, in some other cases, the user may insert the portable storage device into the USB port and leave it unattended even before printing the documents, due to distraction by some other work. In such situations, where the portable storage device is unattended, the portable storage device is susceptible to theft by other users. As a result, when the user realizes that the portable storage device is left at the multi-function device, and goes back to collect his portable storage device, the user may face situation like missing of the portable storage device. Missing of the portable storage device leads to data loss and privacy issues, specifically, in cases where the data is confidential for the user and/or the organization. Therefore, there is a need for methods and systems to handle such scenarios when the user forgets or leaves the portable storage device, for example, USB, at the multi-function device.

SUMMARY

According to aspects illustrated herein, a system for securing a portable storage device connected to a Universal Serial Bus (USB) port of a multi-function device is disclosed. The system includes the portable storage device and the mufti-function device, where the portable storage device is connected to the USB port of the mufti-function device including one or more documents for printing or one or more scanned documents post scanning activity at the multi-function device. The system includes a controller for: determining if the portable storage device is unattended at the multi-function device for a pre-defined time; and based on the determination, activating a retraction assembly to retract the portable storage device into/inside the multi-function device to secure the portable storage device, wherein the retraction assembly is communicatively coupled to the controller.

According to further aspects illustrated herein, a method for securing a portable storage device connected to a Universal Serial Bus (USB) port of a multi-function device is disclosed. The method includes determining if the portable storage device is unattended at the multi-function device for a pre-defined time. Based on the determination, a retraction assembly is activated to secure the portable storage device inside the multi-function device, the retraction assembly includes at least a container. Then, a retraction process is started such that the portable storage is detached from the USB port to the container of the retraction assembly; thereby securing the portable storage device inside the multi-function device.

According to further aspects illustrated herein, a retraction assembly associated with a multi-function device for securing a portable storage device connected to a Universal Serial Bus (USB) port of the multi-function device is disclosed. The retraction assembly includes at least one or more actuators and a container. The one or more actuators are for: retracting the portable storage device to a first position within the multi-function device; moving the portable storage device from the first position to a second position within the multi-function device; and detaching the portable storage device, in the second position, from the USB port to the container. The container is for holding the detached portable storage device to secure the portable storage device inside the multi-function device.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1A:
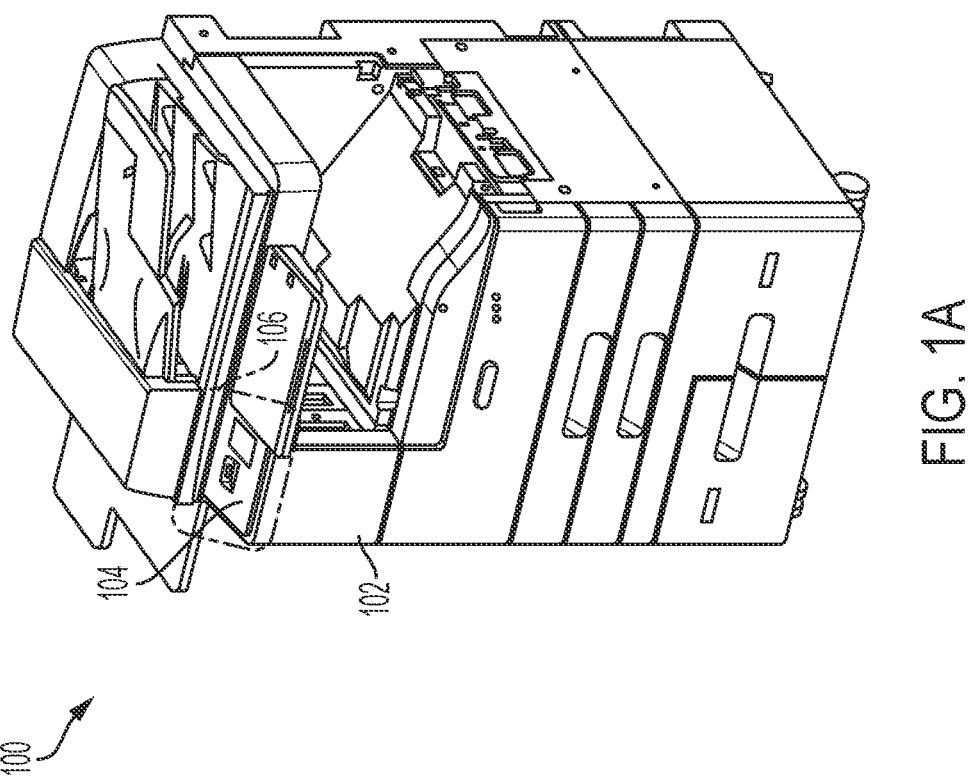
FIG. 1A refers to an exemplary environment in which various embodiments of the disclosure can be practiced.

The following detailed description is made with reference to the figures. Some of the embodiments are described to illustrate the disclosure, not to limit its scope, which is defined by the claims. Those of ordinary skill in the art will recognize a number of equivalent variations in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below. In various embodiments of the present disclosure, definitions of one or more terms that will be used in the document are provided below.

The term "multi-function device" refers to a device or a combination of multiple devices configured to perform one or more functions such as, but not limited to, scanning, printing, copying, imaging, or the like. The multi-function device includes software, hardware, firmware, or a combination thereof. In context of the current disclosure, the multi-function device secures a portable storage device connected to a Universal Serial Bus (USB) port of the multi-function device when the portable storage device is left unattended at the multi-function device or otherwise left at the multi-function device. The multi-function device secures the portable storage device such that it can be later retrieved by a user of the portable storage device and/or by an admin user. To secure the portable storage device, the multi-function device includes a retraction assembly, which will be discussed below in detail The term "portable storage device" refers to an information system component that can be inserted into and removed from a storage port of the multi-function device, and that is used to store data or information (e.g., text, video, audio, and/or image data). Such components are typically implemented on magnetic, optical, or solid-state devices. Examples of the portable storage device include, but are not limited to, flash/thumb drives, external hard disk drives, and flash memory cards/drives that contain non-volatile memory. In context of the present disclosure, the portable storage device may include one or more documents for printing. Alternatively, the portable storage device may include one or more scanned documents resulted from a scanning activity at the multi-function device. The term "data" stored in the portable storage device includes the documents for printing, scanned documents/output or other files in any known or later developed formats.

The term "user device" refers to a device that a user typically uses for his day-to-day work such as to send emails, receive emails, view emails and other purposes. Examples of the user device include, but are not limited to, a personal computer, a desktop, a laptop, a mobile phone, a tablet, a Personal Digital Assistant (PDA), a smart-phone or any other device capable of sending and/or receiving data.

The term "admin device" refers to a device that an admin user of the multi-function device typically uses for his day-to-day tasks such as to send emails, receive emails, view emails and other purposes. Examples of the admin device include, but are not limited to, a personal computer, a desktop, a laptop, a mobile phone, a tablet, a Personal Digital Assistant (PDA), a smart-phone or any other device capable of sending and/or receiving data.

The term "user" refers to any user who uses the multi-function device for printing one or more his documents stored in the portable storage device or may want to scan a document and further store scanned output in the portable storage device. The user can be referred to as an owner of the portable storage device. The term "admin user" refers to a user who manages the multi-function device and/or various activities at the multi-function device.

The term "unattended" refers to a situation when the portable storage device is left by the user at the multi-function device. The portable storage device may be considered left when a particular activity is completed such as printing or scanning. The portable storage device may be left before the start of an activity or during the activity at the multi-function device because of one or more reasons.

The term "retraction assembly" refers to an assembly that includes one or more components such as actuators, or cameras and each component work in tandem with each other to secure the portable storage device inside the multi-function device.

The term "retraction" refers to taking back the attached portable storage device within/inside the multi-function device in order to secure the portable storage device.

Figure 1B:
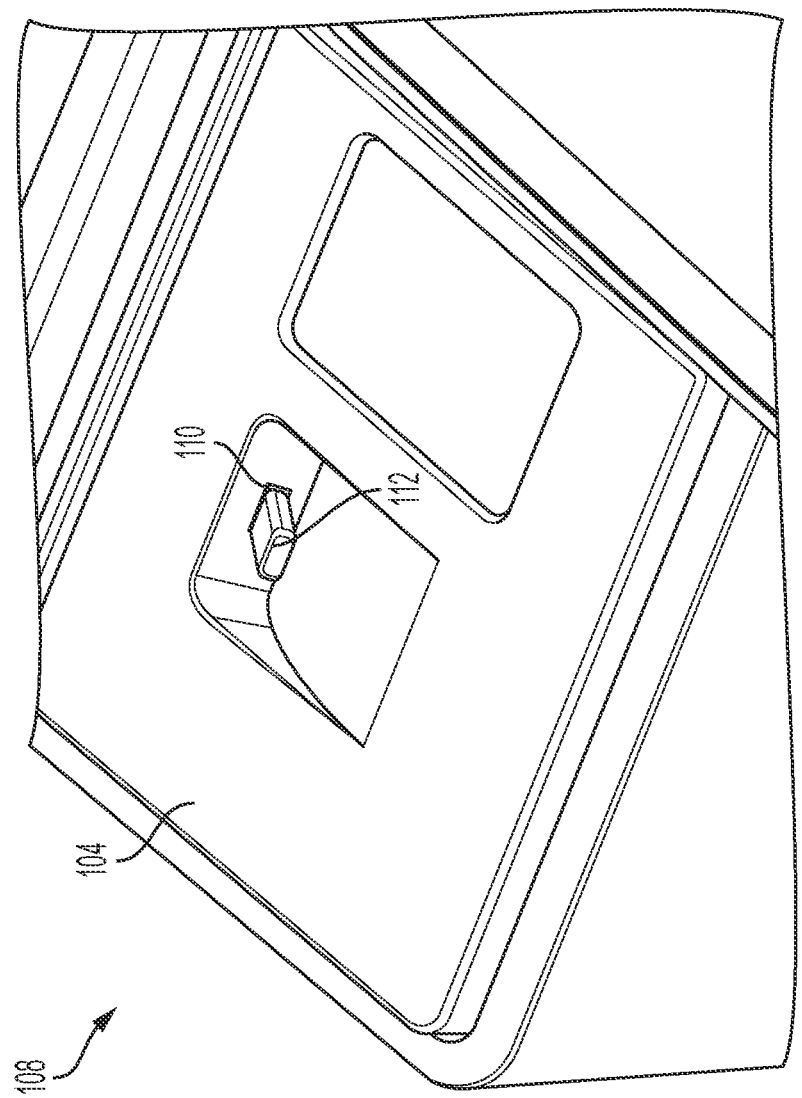
FIG. 1B shows an enlarged view of a portion of a multi-function device including a retraction assembly, according to an embodiment of the present disclosure.

The term "actuator" refers to a device that produces physical movements by converting energy, often electrical, air, or hydraulic, into mechanical force. Examples of the actuator may include, but are not limited to, a rotary solenoid, a linear solenoid, or a direct current (DC) motor, Exemplary Environment FIGS. 1A and 1B refer to an exemplary environment 100 in which various embodiments of the disclosure can be practiced. The environment 100 may include a multi-function device 102, The mufti-function device 102 is a device that performs a variety of functions otherwise carried out by separate devices. For instance, the multi-function device 102 may perform one or more functions such as, but not limited to, scanning, printing, copying, imaging, or the like. In context of the present disclosure, the multi-function device 102 includes a retraction assembly 104 for securing a portable storage device connected to the multi-function device 102 via a Universal Serial Bus (USB) port (directly or indirectly). The USB port is just one example, but the portable storage device can be connected to the multi-function device 102 via known or later developed ways, without limiting the scope of the disclosure An enlarged view 108 of a portion 106 of the multi-function device 102 including the retraction assembly 104 is shown in FIG. 1B. The multi-function device 102 includes a USB port 110 to which a portable storage device 112 such as USB is connected. In operation, if the portable storage device 112 is unattended at the multi-function device 102, for a pre-defined time, the retraction assembly 104 retracts the portable storage device 112 into the multi-function device 102 to secure the portable storage device 112. The retraction of the portable storage device 112 into the multi-function device 102 is explained in greater detail below.

The portable storage device 112 refers to an information system component that can be inserted into and removed from the USB port 110 of the mufti-function device 102, and that is used to store data or information (e.g., text, video, audio, and/or image data). Examples of the portable storage device 112 include, but are not limited to, flash/thumb drives/USB (pen drive), external hard disk drives, and flash memory cards/drives that contain non-volatile memory. For easy discussion, the disclosure will be discussed with USB as an example, but the disclosure is equally applicable other portable storage devices as known or later developed devices.

In operation, a user wishes to perform a pre-defined activity such as printing, scanning or the like at the mufti-function device. In context of the current disclosure, the user wishes to print one or more documents stored in the USB 112. In case of scanning, the user wishes to store scanned output (post scanning activity is completed) in the USB 112. To this end, the user attaches the USB 112 to the USB port 110 of the mufti-function device 102. The USB 112 includes one or more documents for printing. The document may include content in the form of text, image, graphics, or a combination thereof. The user selects a document he wishes to print and the mufti-function device 102 prints the document based on one or more print parameters submitted by the user at the multi-function device 102. The print parameters may be single side/double side, black & white/color, quality, destination, output, orientation, size, or the like. The multi-function device 102 completes printing the document and the user collects the printed document. Here, the user may forget to collect the USB 112 after print activity is completed at the mufti-function device 102 and thus leaves the USB 112 attached to the device 102. In context of the present disclosure, the multi-function device 102 determines whether the USB 112 is left unattended for a pre-defined time after the pre-defined activity such as printing is completed for the user. The pre-defined time can be 10 minutes, 15 minutes, 5 minutes and so on. The pre-defined time can be defined by the admin user or can be changed later based on the requirement. But there can be other scenarios when the USB 112 can be considered unattended by the multi-function device 102. For example, when no activity is happening/started at the multi-function device 102 such as printing or scanning for a pre-defined time and the USB 112 is found attached to the multi-function device 102. The USB 112 attached to the USB port 110 for the pre-defined time or more than a certain amount of time, indicates that the USB 112 is left by the user because of one or more reasons. Based on this determination, the multi-function device 102 activates the retraction assembly 104 to retract the attached USB 112 within the multi-function device 102 in order to secure the USB 112. The secured USB later can be retrieved by the user or an admin user of the multi-function device 102. More details on the retraction assembly 104, its components and its functioning will be discussed in detail below.

The environment 100 is shown to include the multi-function device 102, but the environment 100 may include a scanner, a printer, a multi-function printer, or any device with printing and/or scanning functionality with USB functionality.

Exemplary System

Figure 2A:
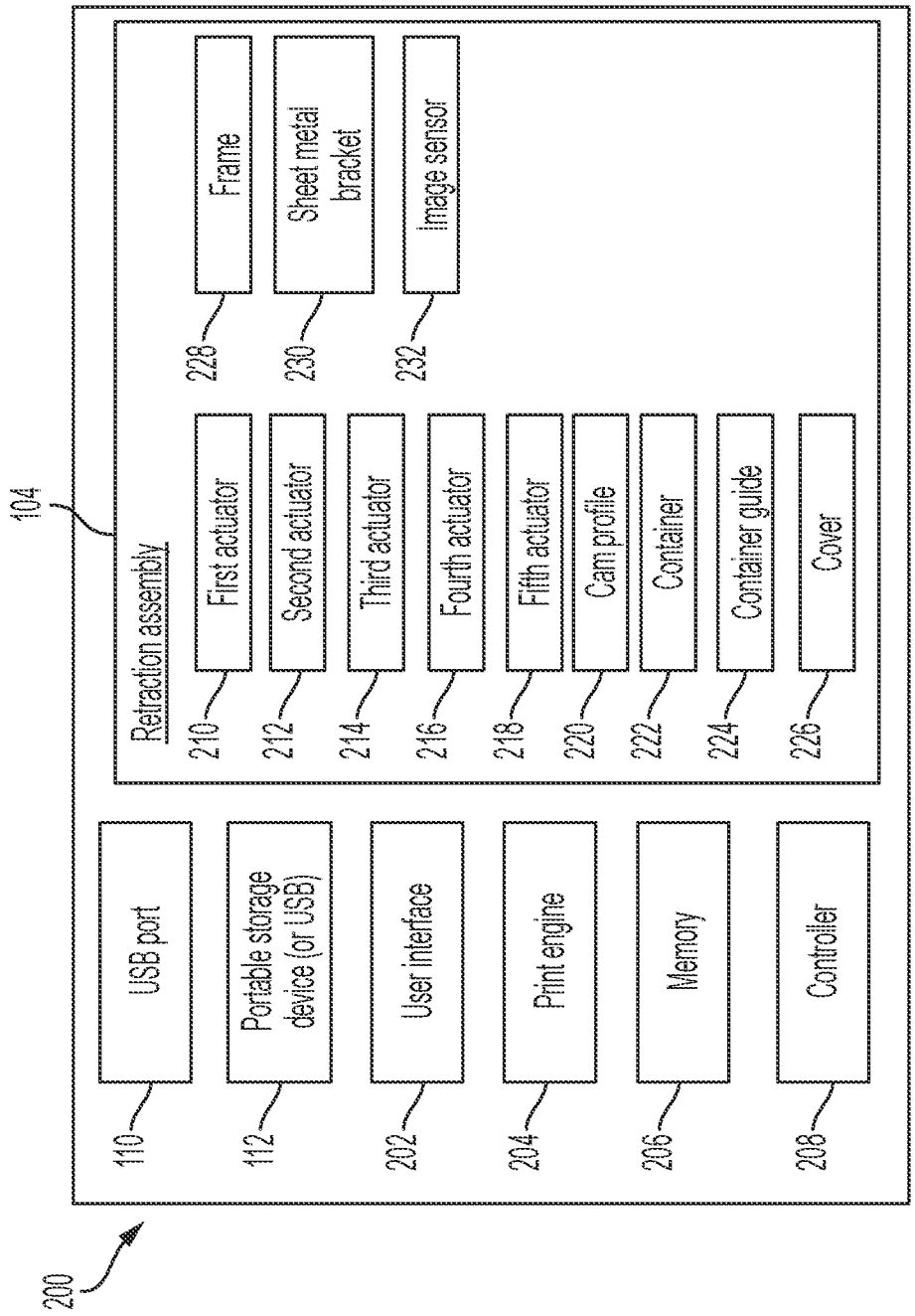
FIG. 2A is a block diagram of a system for securing a portable storage device connected to a Universal Serial Bus (USB) port of the multi-function device, according to an embodiment of the present disclosure.

FIG. 2A shows a system 200 for securing a portable storage device such as portable storage device 112. The system 200 includes portable storage device 112 and a multi-function device 102. Hereinafter, the disclosure will be discussed with USB as an example of the portable storage device 112 and the portable storage device 112 will be referred to as 'USB'. The multi-function device 102 further includes the USB port 110, the retraction assembly 104, a user interface 202, a print engine 204, a memory 206 and a controller 208. The retraction assembly 104 includes a first actuator 210, a second actuator 212, a third actuator 214, a fourth actuator 216, a fifth actuator 218, a cam profile 220, a container 222, a container guide 224, a cover 226, a frame 228, a sheet metal bracket 230, and an image sensor 232. The components 202-232 are connected to each other via a conventional bus or a later developed protocol. The components 202-232 communicate with each other for performing various functions of the present disclosure. The multi-function device 102 or the system 200 may further include additional component(s) as required to implement the present disclosure.

The controller 208 may be implemented by a combination of hardware and software. The "hardware" may comprise a combination of discrete components, an integrated circuit, an application-specific integrated circuit (ASIC), a field programmable gate array (FPGA), a processor, or other suitable hardware. The "software" may comprise one or more objects, agents, threads, lines of code, subroutines, separate software applications, two or more lines of code or other suitable software structures executable by the processor. In some other embodiments, the controller 208 may be implemented by computer executable program instructions.

In context of the present disclosure, the USB 112 include one or more documents for printing at the multi-function device 102. The document may include content in form of text, image, graphics, or a combination thereof. The document may be in form of a digital version. In implementation, a user inserts the USB 112 into the USB port 110 of the multi-function device 102. In response to inserting the USB 112 into the USB port 110, the controller 208 provides the user interface 202 to the user for inputting credentials. The credentials may include a username, user ID, employee ID, organization ID, a password, a passcode or a combination thereof. The user inputs the credentials and then initiates printing the one or more documents stored in the USB 112. Before printing the one or more documents, the user submits one or more print parameters required for printing the documents. The print parameters can be provided by the user through the user interface 202. If the USB 112 includes a list of documents, the user may select a document that he wishes to print. This way, the controller 208 initiates printing and commands the print engine 204 to print the selected document according to the print attributes.

The print engine 204 completes printing the document and communicates the same to the controller 208. After completion of the printing, the user collects the printed documents and moves away from the multi-function device 102. In context of the present disclosure, the user forgets to take the USB 112 or otherwise the USB 112 remains plugged/attached at/to the multi-function device 102. Here, the USB 112 is considered as unattended at the multi-function device 102. In other examples, the user may have to leave in hurry due to some other work or otherwise forgets to take the USB 112 back after print completion. Alternatively, the user may leave the USB 112 unattended even before printing the documents at the multi-function device 102, due to distraction by some other work. These are two examples, but there can be other examples where the user leaves or forgets to take the USB 112 back after print completion or even before printing is initiated or while the document is getting printed at the multi-function device 102. In all such cases, where the USB 112 is unattended, the controller 208 and the retraction assembly 104 works in conjunction with each other to secure the USB 112 inside the multi-function device 102.

In operation, the controller 208 determines if the USB 112 is unattended at the multi-function device 102 after a pre-defined time or for a pre-defined time after printing is completed for example. The pre-defined time may be 10 seconds, 60 seconds, 1 minute, 5 minutes, 10 minutes and so on. The pre-defined time can be set by an admin user of the multi-function device 102 or can be set at the time of manufacturing the mufti-function device 102 without deviating from the scope of the disclosure. The controller 208 may determine the USB 112 as unattended when no activity by the user at the user interface 202 post print completion. In other examples, the controller 208 may determine the USB 112 as unattended when no user is found/detected near the mufti-function device 102. This can be determined based on user presence detection using cameras as known or later developed. In all such cases when the USB 112 is considered unattended at the multi-function device 102, the controller 208 activates the retraction assembly 104 to secure the USB 112.

Figure 2B:
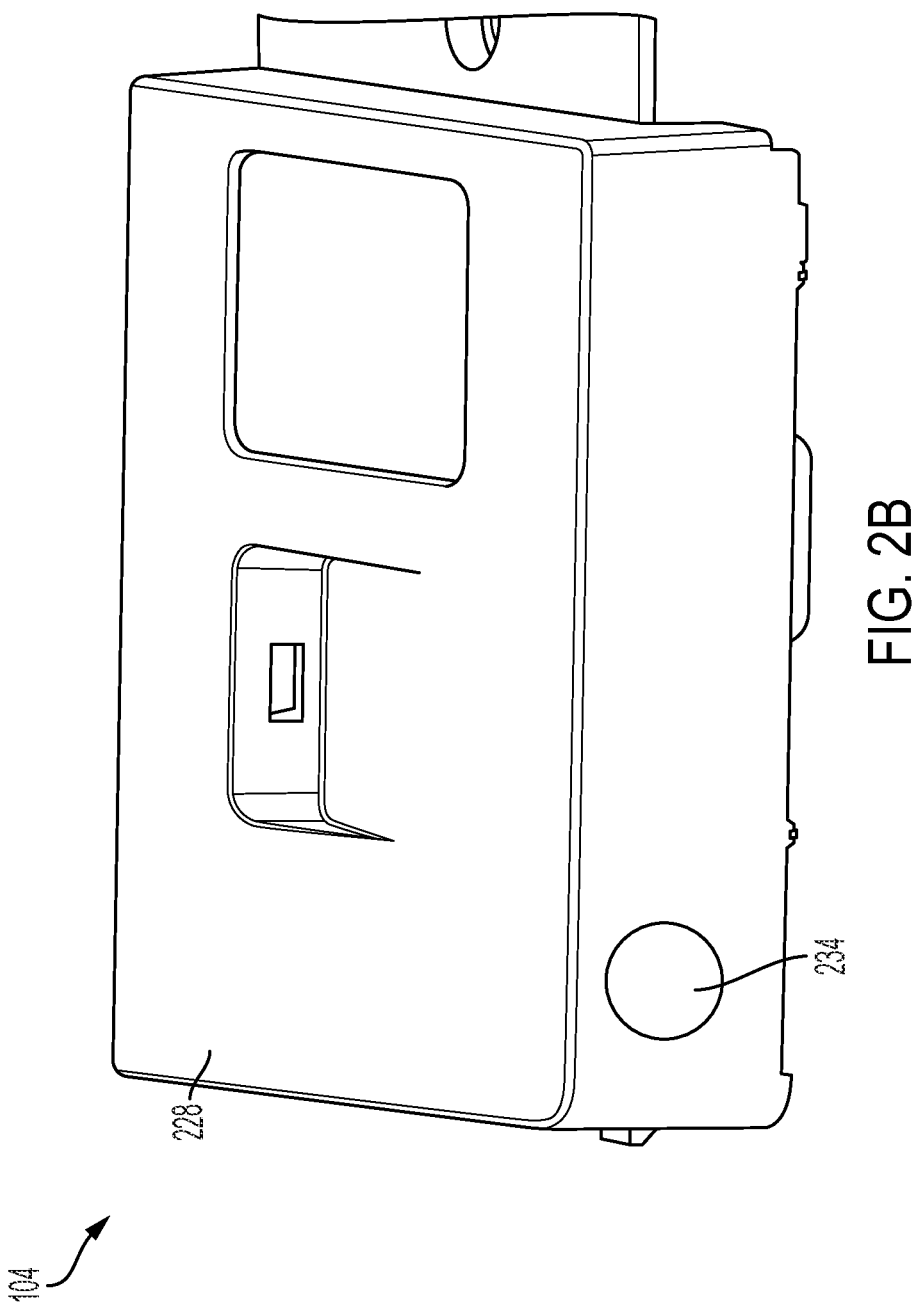
FIG. 2B shows a perspective view of the retraction assembly including a camera for detecting the presence of a user or an admin user, near the multi-function device, according to an embodiment of the present disclosure.

FIG. 2B shows a perspective view of the retraction assembly 104 and includes a camera 234 for detecting the presence of the user near the multi-function device 102. The camera 234 is installed such that the camera 234 captures images of human movements in proximity to the multi-function device 102. The controller 208 may process the images captured by the camera 234 to detect presence of the user in proximity to the multi-function device 102. If it is determined that the user is not in proximity to the mufti-function device 102, then the controller 208 determines that the USB 112 is unattended at the multi-function device 102.

Alternatively, a human detection camera and a face detection camera may be installed on the multi-function device 102. The human detection camera is installed at a location on the multi-function device 102 such that the human detection camera captures images of human movements in proximity to the mufti-function device 102. For example, the human detection camera may be installed in an aperture at the bottom of pillar cover on front of the mufti-function device 102. The face detection camera is installed at a location on the multi-function device 102 such that the face detection camera captures images of user face. For example, the face detection camera may be installed at upper left of the multi-function device's control panel. The controller 208 may process the images captured by the human detection camera to detect the presence of the user in proximity to the multi-function device 102. The controller 208 may process the images captured by the face recognition camera to identify the user. To that end, based on the processing of the images captured by the human detection camera and/or the images captured by the face detection camera, the controller 208 may determine if the user is present at the multi-function device 102. If it is determined that the user is not present at/near the multi-function device 102, then the controller 208 determines that that the USB 112 is unattended at the multi-function device 102. In other examples, the controller 208 may determine the presence of the user near the multi-function device 102 using a proximity sensor. The controller 208 accordingly determines that the USB 112 is unattended at the mufti-function device 102.

Based on the determination that the USB 112 is unattended at the multi-function device 102 for the pre-defined time, the controller 208 activates the retraction assembly 104 to secure the USB 112 inside the mufti-function device 102. Specifically, the retraction assembly 104 is activated to retract the USB 112 into the multi-function device 102 to secure the USB 112. The retraction assembly 104 includes one or more components that work together to retract the USB 112 into the multi-function device 102 to secure the USB 112.

Figure 2C:
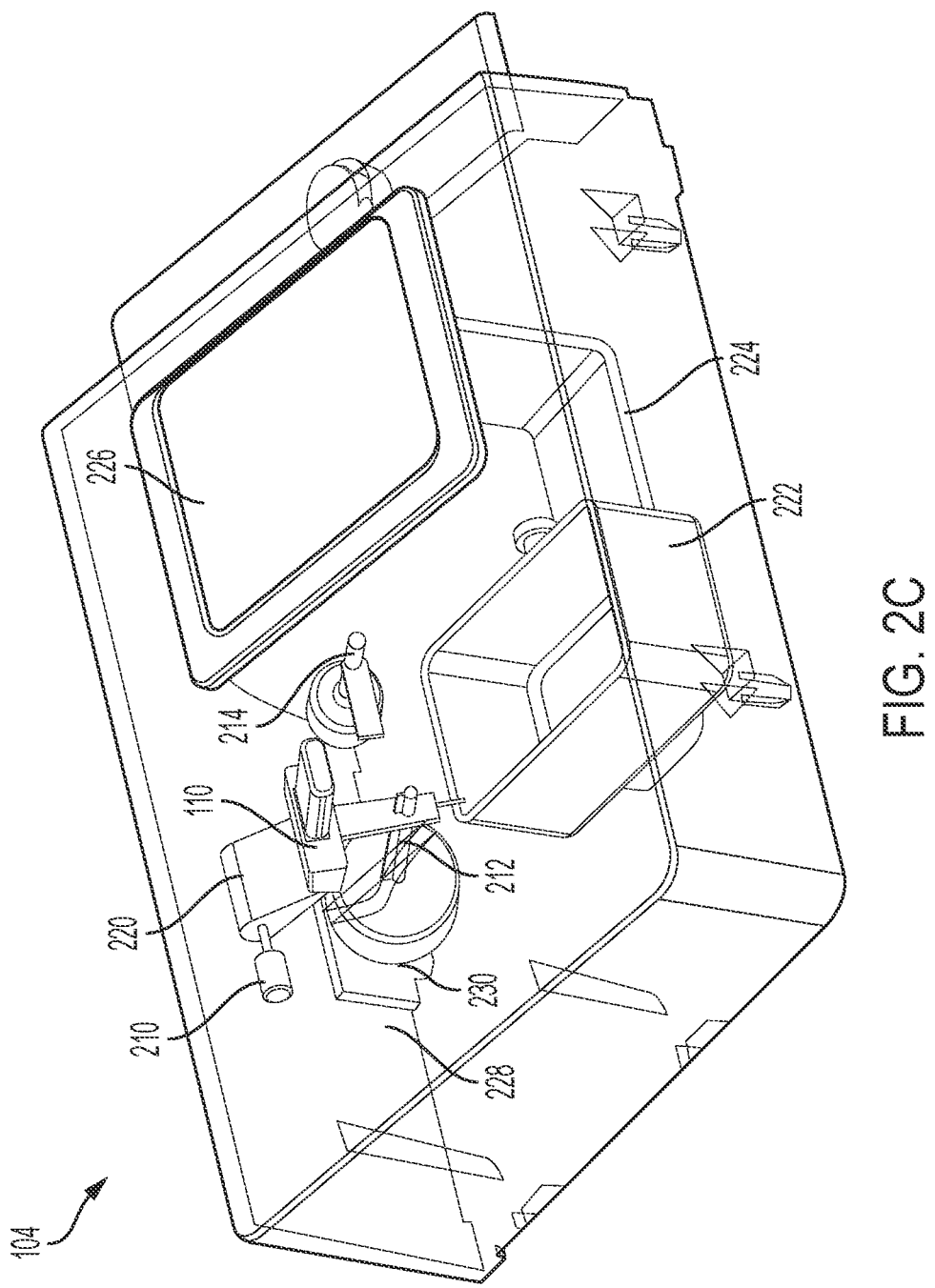
FIG. 2C shows a perspective view of the retraction assembly illustrating one or more components of the retraction assembly, according to an embodiment of the present disclosure.

FIG. 2C shows a perspective view of the retraction assembly 104 depicting one or more components of the retraction assembly 104. The retraction assembly 104 includes the first actuator 210, the cam profile 220, the second actuator 212, the third actuator 214, the container 222, the container guide 224, the cover 226, the frame 228, and the sheet metal bracket 230. The first actuator 210 may be attached to the frame 228 using the sheet metal bracket 230. The first actuator 210 may be a rotary solenoid that produces rotary motion. The first actuator 210 may be an electric motor such as a direct current (DC) motor and a stepper motor. The cam profile 220 is connected to the first actuator 210.

Figure 2D:
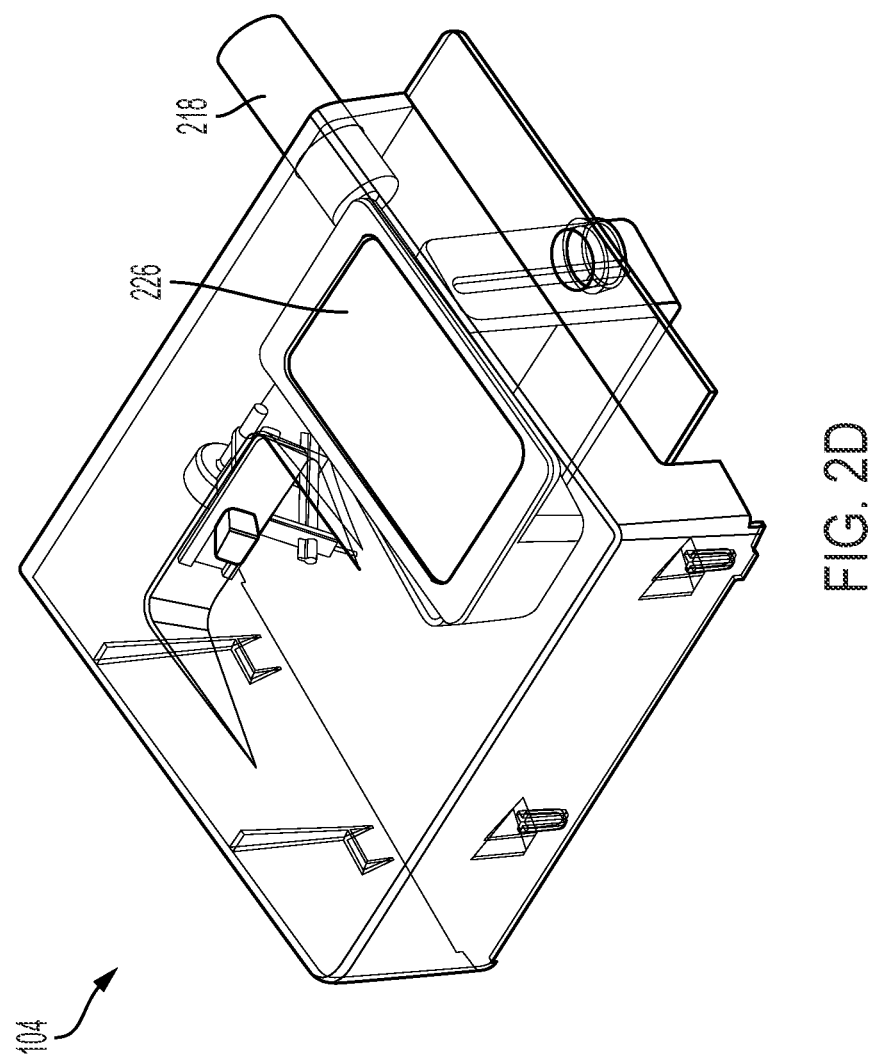
FIG. 2D shows a perspective view of the retraction assembly illustrating a fifth actuator of the retraction assembly, according to an embodiment of the present disclosure.

The second actuator 212 is attached to the frame 228 using the sheet metal bracket 230. The second actuator 212 may be a rotary solenoid or the electric motor that produces rotary motion. The third actuator 214 may be one of: a linear solenoid or a linear motor that produces linear movements. The container 222 is attached to the container guide 224. The retraction assembly 104 includes a fourth actuator (not shown in figure) for moving, based on the container guide 224, the container 222 to the cover 226. The fourth actuator may be one of: a linear solenoid, or an electric motor such as a DC motor and a stepper motor. As shown, a shape of the container guide 224 is such that when the container 222 is moved along the container guide 224, the container 222 is moved to the cover 226. The cover 226 covers an opening of the retraction assembly 104. The retraction assembly 104 includes a fifth actuator. FIG. 2D shows a perspective view of the retraction assembly 104 depicting the fifth actuator 218. The fifth actuator 218 is for opening the cover 226. The fifth actuator 218 may be one of; a linear solenoid, or an electric motor such as a DC motor and a stepper motor.

The aforementioned parts of the retraction assembly 104 work together to retract the USB 112 into the multi-function device 102 to secure the USB 112, as described below with reference to FIGS. 3A-3E.

Figure 3A:
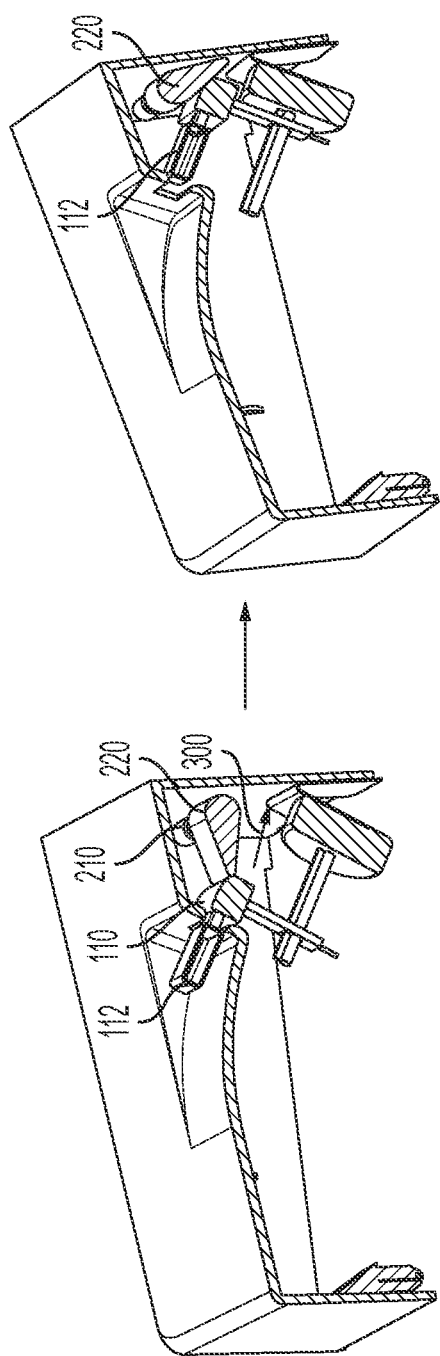
FIGS. 3A-3M show different snapshots of the retraction assembly in operation to secure the portable storage device, according to an embodiment of the present disclosure.

FIGS. 3A-3E show different snapshots of the retraction assembly 104 in function to secure the USB 112. When the retraction assembly 104 is activated by the controller 208, based on the determination that the USB 112 is unattended at the multi-function device 102 for the pre-defined time, the first actuator 210 retracts the USB 112 to a first position within the multi-function device 102 by moving the cam profile 220 in a direction 300, as shown in FIG. 3A. The first position refers to a position to which the first actuator 210 retracts the USB 112 from the outside of the multi-function device 102 to the inside of the mufti-function device 102.

Figure 3B:
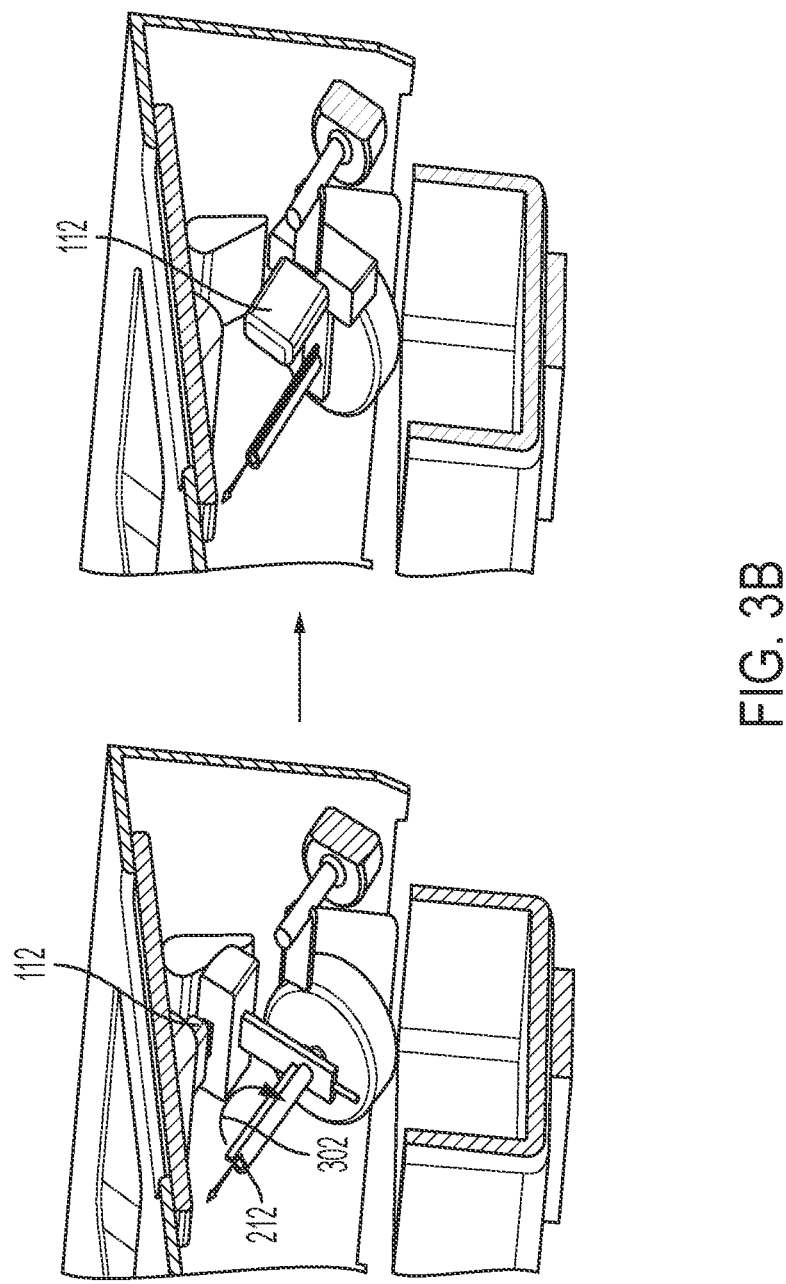

Further, the USB 112 in the first position is moved to a second position within the multi-function device 102 by the second actuator 212. For instance, the second actuator 212 rotates the USB 112 in a direction 302 to move the USB 112 from the first position to the second position within the multi-function device 102, as shown in FIG. 3B. The second position refers to a position to which the second actuator 212 moves the USB 112 within the multi-function device 102.

Figure 3C:
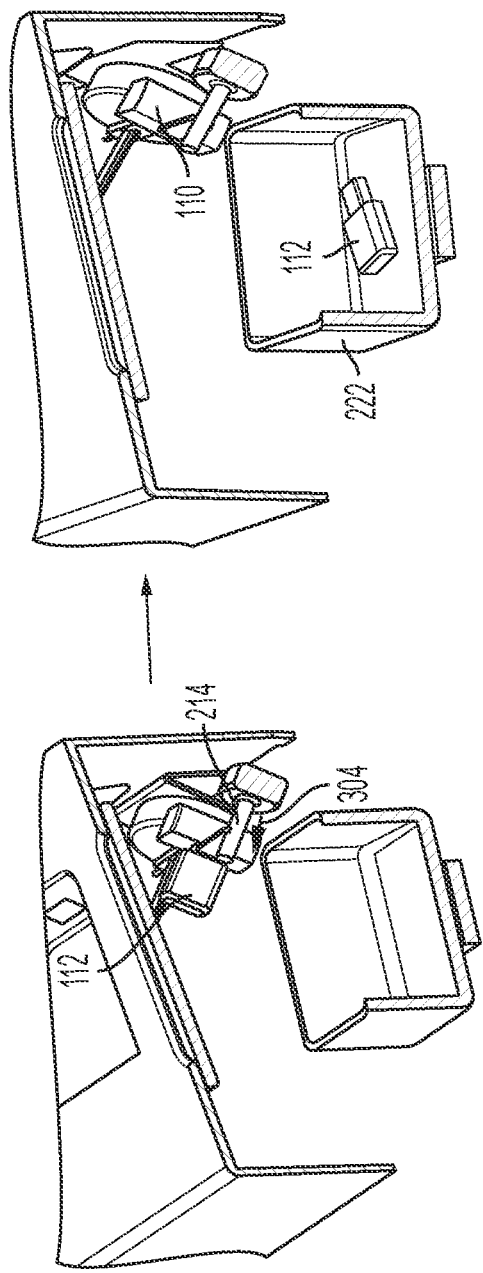

The third actuator 214 detaches the USB 112, in the second position, from the USB port 110. For instance, the third actuator 214 may move linearly in a direction 304 to push and detach the USB 112 from the USB port 110, as shown in FIG. 3C. When the USB 112 is detached from the USB port 110, the USB 112 falls into the container 222. To that end, the container 222 holds the detached USB 112.

Figure 3D:
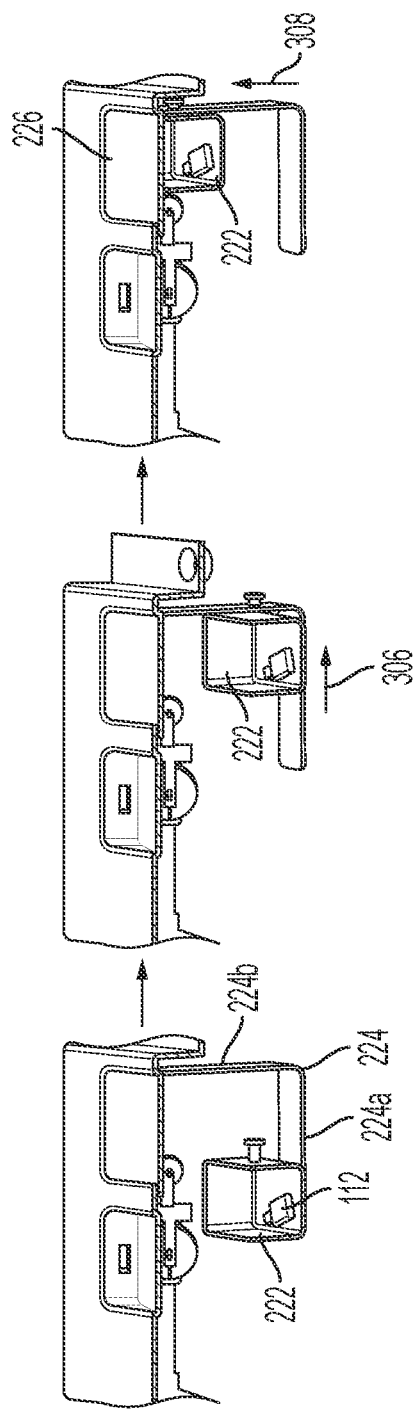

Further, the container 222 holding the detached USB 112 is moved to the cover 226, as shown in FIG. 3D. The retraction assembly 104 includes the fourth actuator (not shown in figure) for moving the container 222 to the cover 226. The fourth actuator moves the container 222 along the container guide 224, i.e., in a horizontal direction 306 and further in a vertical direction 308 along the container guide 224, to move the container 222 to the cover 226. To that end, the container 222 holding the detached USB 112 is moved to the opening of the retraction assembly 104 covered by the cover 226.

Alternatively, the retraction assembly 104 may include a horizontal actuator and a vertical actuator for moving the container 222 to the cover 226. The horizontal actuator and the vertical actuator may be the linear solenoids or the electric motors. The horizontal actuator may be placed at a bottom portion 224a of the container guide 224. The vertical actuator may be placed a side portion 224b of the container guide 224. The horizontal actuator moves the container 222 horizontally, i.e., in the direction 306, and further the vertical actuator moves the container 222 vertically, i.e., in the direction 308, to move the container 222 to the cover 226 (i.e., to the opening of the retraction assembly 104 covered by the cover 226).

In such a manner, the USB 112 connected to the USB port 110 is retracted into the multi-function device 102 and held in the container 222 to secure the USB 112.

The container 222 further includes the image sensor 232, such as a camera (not shown in FIG. 3D). The image sensor 232 is located in the container 222 such that the image sensor 232 captures an image of the USB 112 held in the container 222. The captured image is then transmitted to the controller 208. The image sensor 232 captures the image of the USB 112 for easy recognition by the user and/or by the admin user. The image sensor 232 can be located anywhere in the container 222 such that the image of the USB 112 can be captured. The image sensor 232 is inside the container 222 and is different from the camera 234 of FIG. 2B which is to detect the presence of the user near/around the multi-function device 102.

Post the USB 112 is successfully retracted into the multi-function device 102, the controller 208 then notifies the user and/or the admin user of the multi-function device. Based on the last login credentials at the multi-function device 102, the controller 208 identifies which user the notification needs to be sent. For example, the controller 208 transmits a notification to any user device associated with the user of the USB 112 via a network. The network may be wired, wireless, or any combination of wired and wireless communication networks, such as cellular, Wi-Fi, internet, local area networks, or the like. The notification may include the image of the USB 112 held in the container 222, a text message, or a combination thereof. The image of the USB 112 helps the user easy identification of his storage device 112. The text message may include a message for the user indicating that the USB 112 is secured inside the multi-function device 102 and/or further reminds the user to retrieve the USB 112 from the multi-function device 102. The notification may be transmitted based on a pre-defined format as defined at the multi-function device 102. Similarly, the notification is sent to the admin user of the multi-function device 102.

Further, when the user device receives, from the controller 208, the notification including the image of the USB 112 held in the container 222, the user may view the image of the USB 112 held in the container 222 and confirm if the USB 112 belongs to the user. Further, the user may reach the multi-function device 102 and retrieve the USB 112.

Figure 3E:
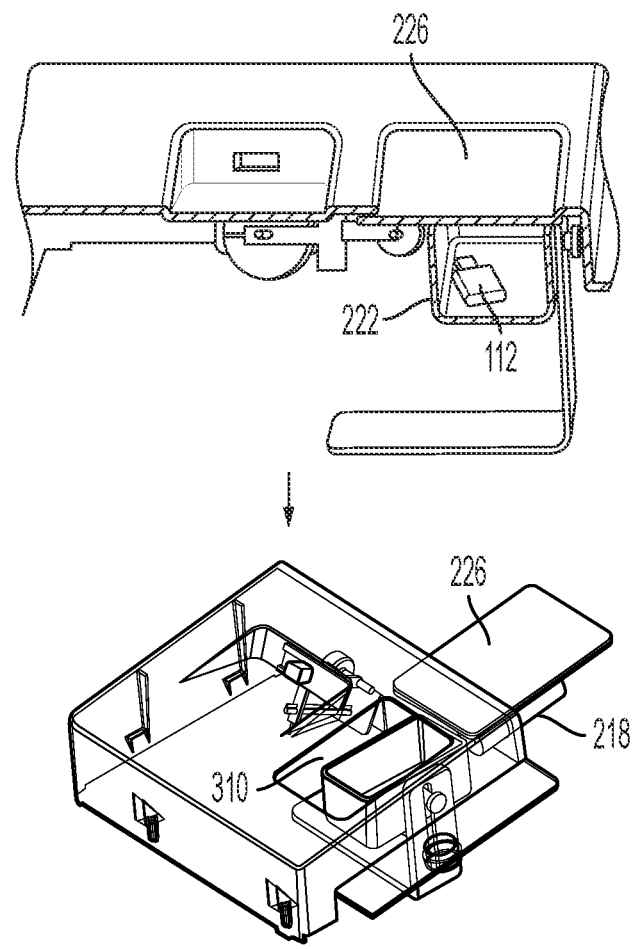

To retrieve the USB 112, the user is required to input his credentials at the multi-function device 102. The credentials may be username, user ID, employee ID, password, a One Time Password (OTP), or a combination thereof. Upon receiving the credentials, the controller 208 matches the received credentials with the user credentials stored in the memory 206 of the multi-function device 102. If matches, the controller 208 allows the user to retrieve the USB 112 at the multi-function device 102. The controller 208 further triggers the retraction assembly 104 to allow the user to access the container 222. The controller 208 may control the fifth actuator 218 to open the cover 226 as shown in FIG. 3E. When the cover 226 is opened, the user may retrieve the USB 112 from the container 222 via the opening 310 of the retraction assembly 104.

Similarly, the admin user can retrieve the USB 112 secured inside the multi-function device 102 using his admin credentials. The admin credentials may include a username and/or a password of the admin. The controller 208 matches the credentials as input by the admin user with the admin credentials as stored at the multi-function device 102 and further allows the admin user to retrieve the USB 112 from the multi-function device 102.

In case the USB 112 is retrieved by the admin user, the user is notified that the USB 112 is retrieved by the admin user. An exemplary message may be: "your pen drive is collected by the admin user, please contact him for collection".

Looping back to the discussion, if the input user credentials don't match with the stored user credentials, the controller 208 does not allow the user to retrieve the USB 112 as secured in the multi-function device 102.

The controller 208 may send the notification to both the user and the admin user. Transmitting the notification to both the user and the admin user allows the admin user to retrieve the USB 112 in case the user does not retrieve in 1 day time or may not get time to see the notification. In such cases, the admin user can retrieve the USB 112 and manually handover the USB 112 to the user.

Figure 3F:
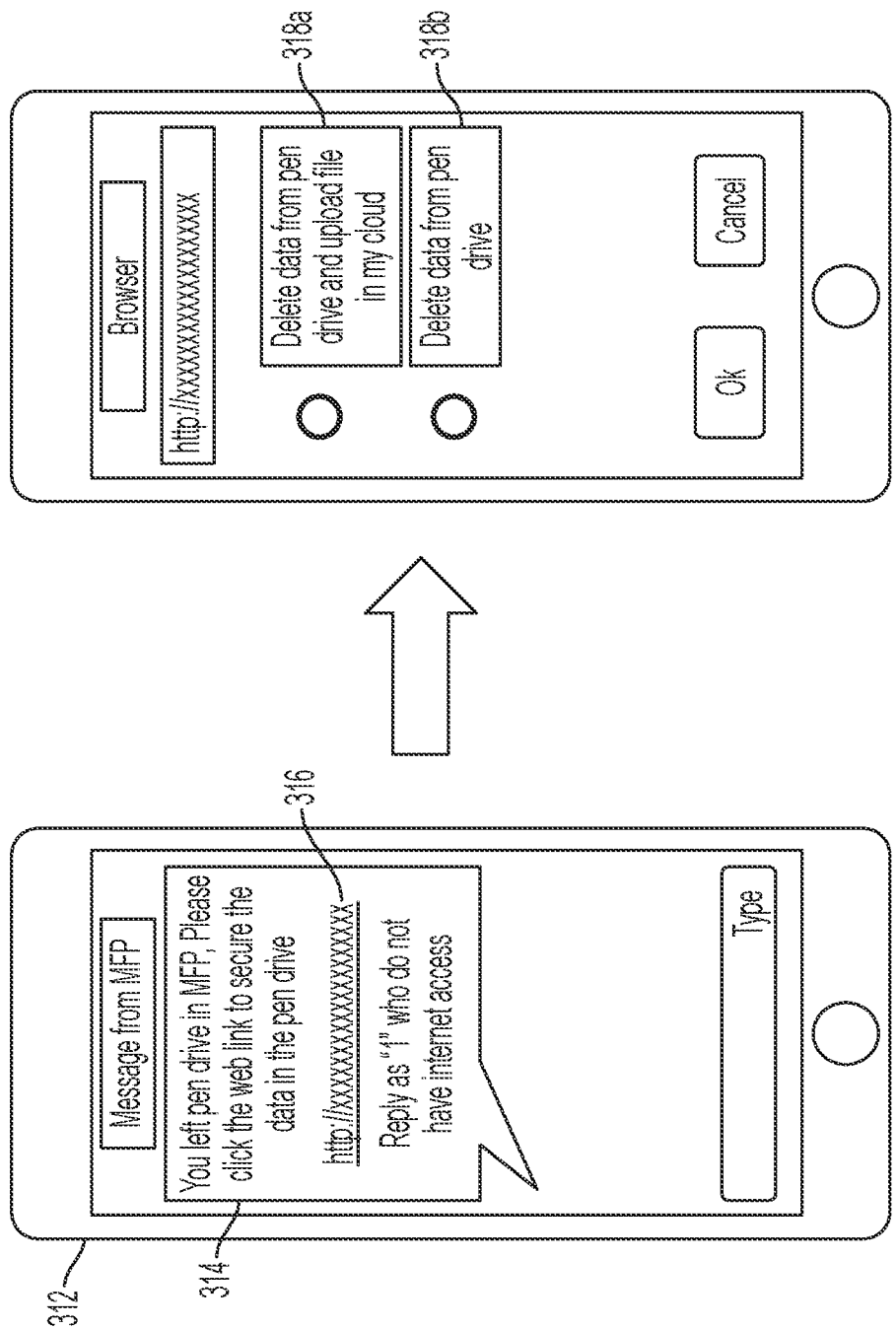

In some implementations, the controller 208 sends a notification including a webpage link to the user device to allow the user to secure the data (e.g., documents) stored in the USB 112. An exemplary notification 314 including a webpage link 316 received at a user device 312 is shown in FIG. 3F. The user may tap on the webpage link 316. In response to the user tapping on the webpage link 316, the user is provided with options 318a (first option) and 318b (second option). The user may select the option 318a to upload the data stored in the USB 112 to a cloud storage of the user and delete the data from the USB 112. Alternatively, the user may select the option 318b to delete the data from the USB 112.

Figure 3H:
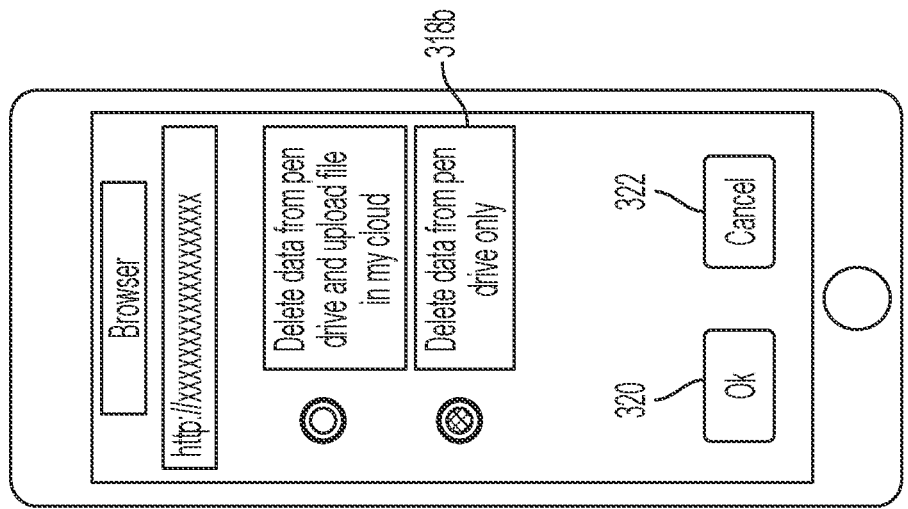
Figure 3G:
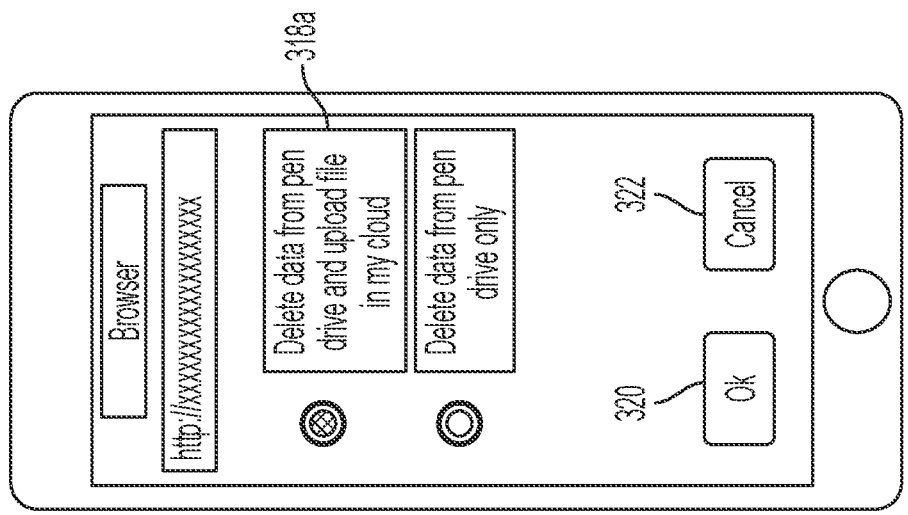

In particular, the user selects the option 318a and, subsequently, an option 320 'Ok', to upload the data stored in the USB 112 to the cloud storage of the user and delete the data from the USB 112, as shown in FIG. 3G. The cloud storage may be a remote storage system provided by a cloud storage network provider for remotely storing the data. For example, the cloud storage network provider can be a third-party service provider. The cloud storage may include one or more servers and large storage subsystems. The user may later access the cloud storage and retrieve the data uploaded from the USB 112.

Alternatively, the user may select the option 318b and, subsequently, the option 320 'Ok', to delete the data from the USB 112, as shown in FIG. 3H. The user may select an option 322 'Cancel' to execute no action, i.e., neither delete nor upload the data stored in the USB 112. In this way, if the user device 312 has internet access, the user can secure the data stored in the USB 112, using the webpage link 316 given in the notification 314.

Figure 3I:
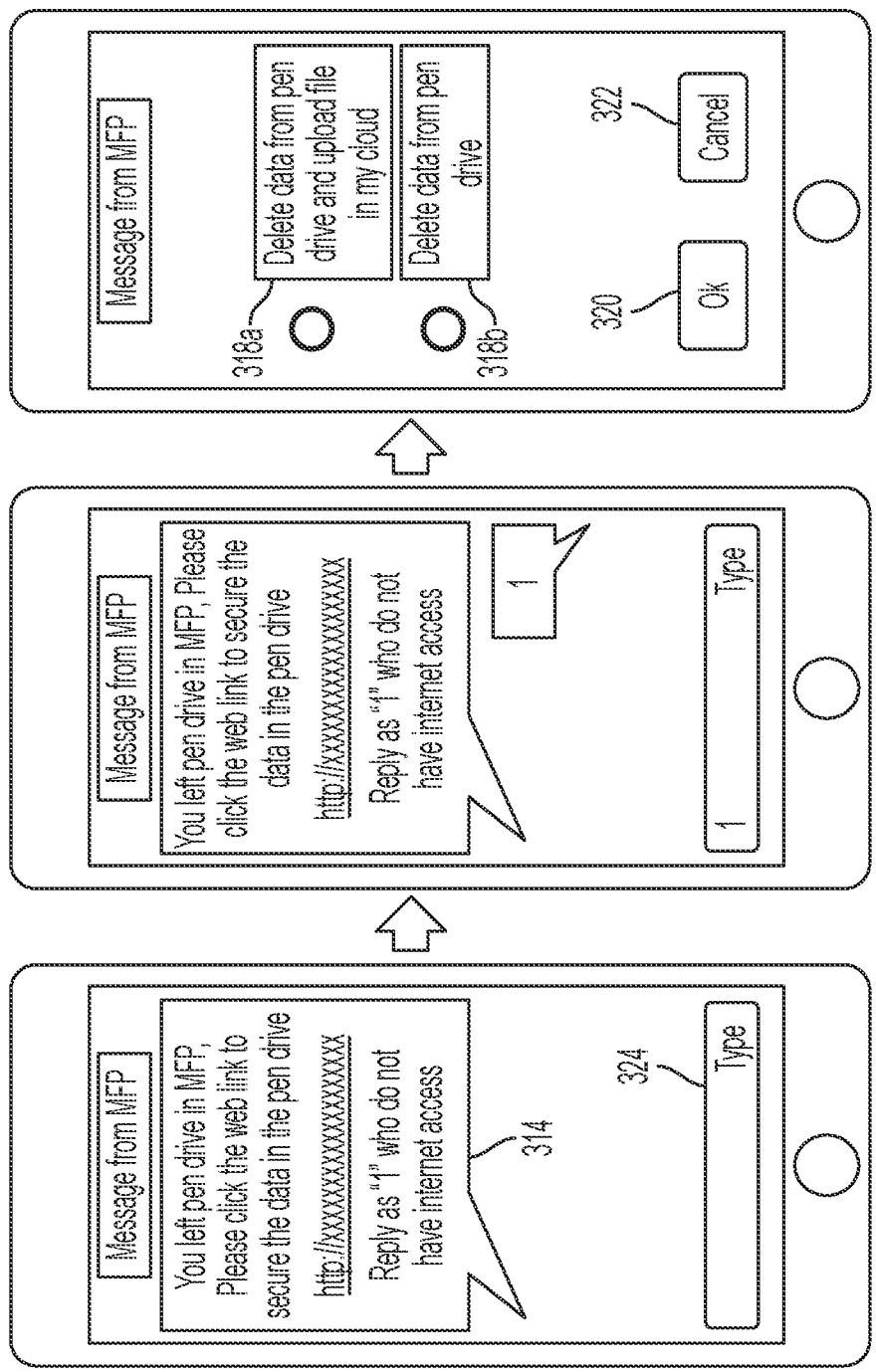
Figure 3K:
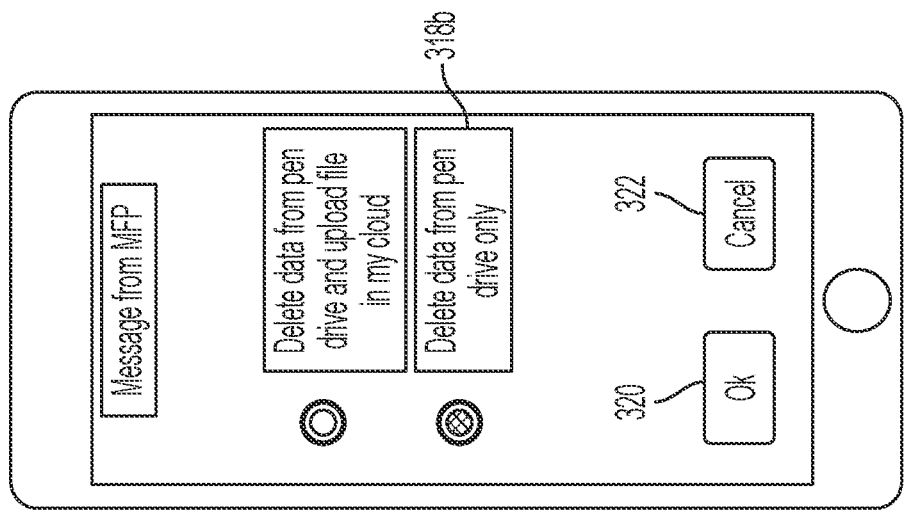
Figure 3J:
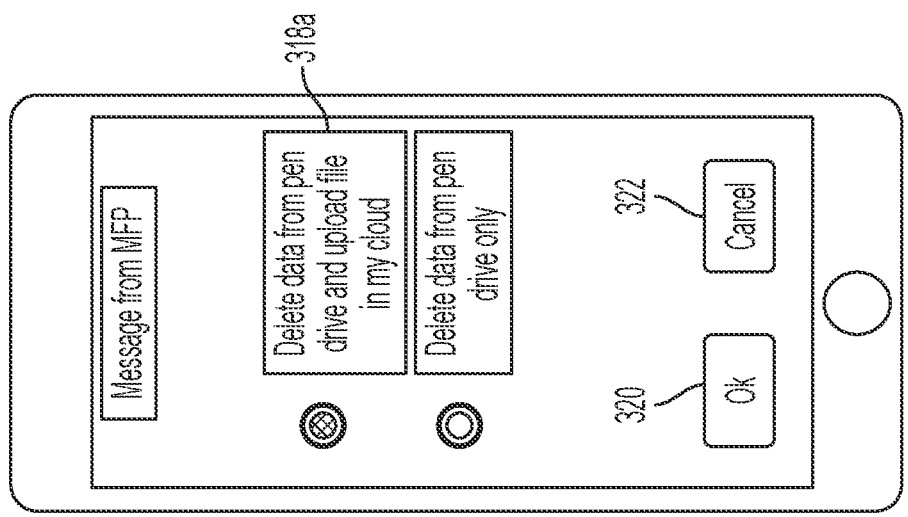

In case, if the user device 312 doesn't have the internet access, the user can secure the data stored in the USB 112 by responding to the notification 314 with a character given in the notification 314. For example, the user may respond to the notification 314 by typing '1' at a type section 324, as shown in FIG. 3I. In response, the user is provided with the options 318a and 318b. The user may select the option 318a and, subsequently, the option 320 'Ok', to upload the data stored in the USB 112 to the cloud storage and delete the data from the USB 112, as shown in FIG. 3J. Alternatively, the user may select the option 318b and, subsequently, the option 320 'OK', to delete the data from the USB 112, as shown in FIG. 3K.

Such a provision of securing the data stored in the USB 112 by uploading the data to the cloud storage and/or deleting the data from the USB 112, allows the user to secure the data in the USB 112 in case the user is highly unlikely to go back to the multi-function device 102, for example, the user may have moved to a far distance from the multi-function device 102 after collecting the printed documents.

Figure 3L:
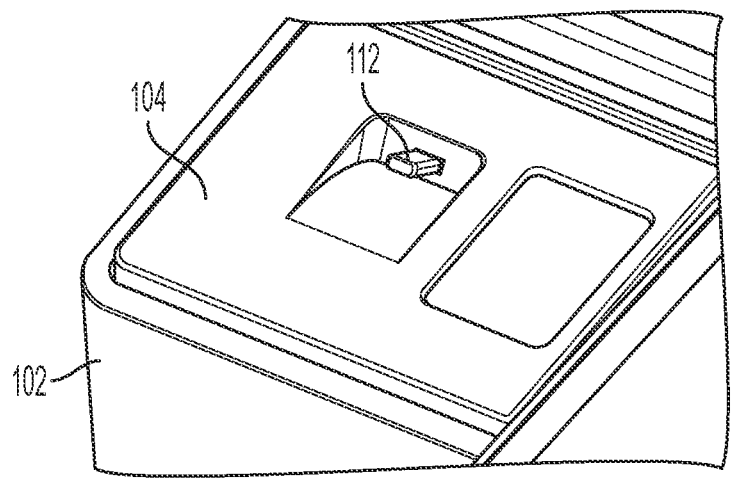
Figure 3M:
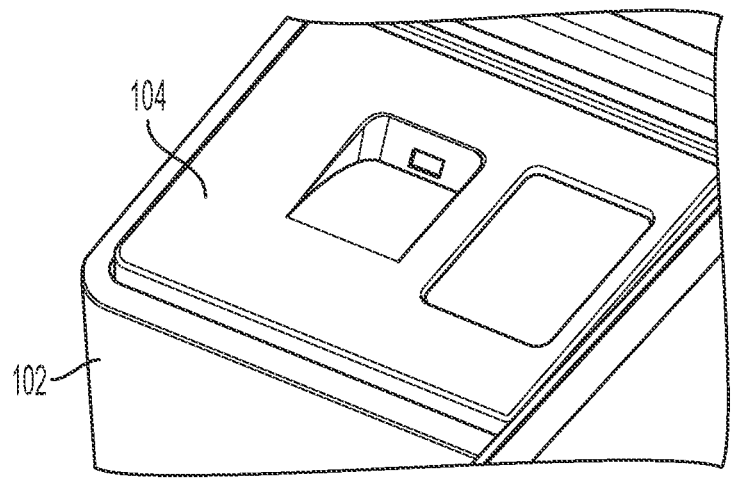

The USB 112 when attached to the multi-function device 102 is shown FIG. 3L. When the present disclosure is implemented, the retraction assembly 104 retracts the attached USB 112 within/inside the multi-function device 102. The USB 112 when/after retracted inside the multi-function device 102 is shown in FIG. 3M.

The user interface 202 can be used for providing inputs to the multi-function device 102 and/or can be used for displaying information. For example, the user uses the user interface 202 to input his credentials as discussed above. The user can further make any selection of various options displayed through the user interface 202. In another example, the user interface 202 displays various information to the user such as a pre-defined message to the user about the USB 112 and so on. The details are displayed to the user in real-time.

The memory 206 stores various information such as the user credentials, pre-defined messages, documents printed by the user, print settings, scan settings, and other details. The stored details can be retrieved by the controller 208 for implementing the current disclosure. The details discussed here is exemplary in nature and other details relevant for implementing the current disclosure can be stored in the memory 206.

FIG. 2A is discussed wrt printing scenarios but the disclosure is applicable for scanning or other imaging scenarios. For example, in case of scanning, the multi-function device 102 includes additional components such as platen and/or Automatic Document Handler (ADH), and a scanner (not shown) for scanning purpose. The scanner scans document submitted for scanning and outputs a scanned document. The user stores the scanned document in the USB 112 but due to some reason forgets the USB 112 at the multi-function device 102. In such cases too, the attached USB 112 can be secured using the retraction assembly 104 discussed above.

The retraction assembly 104 (and its components 210-232), the USB port 110, the user interface 202, the print engine 204, the memory 206 and the controller 208 collectively forms the multi-function device 102.

Exemplary Method Flowcharts

Figure 4:
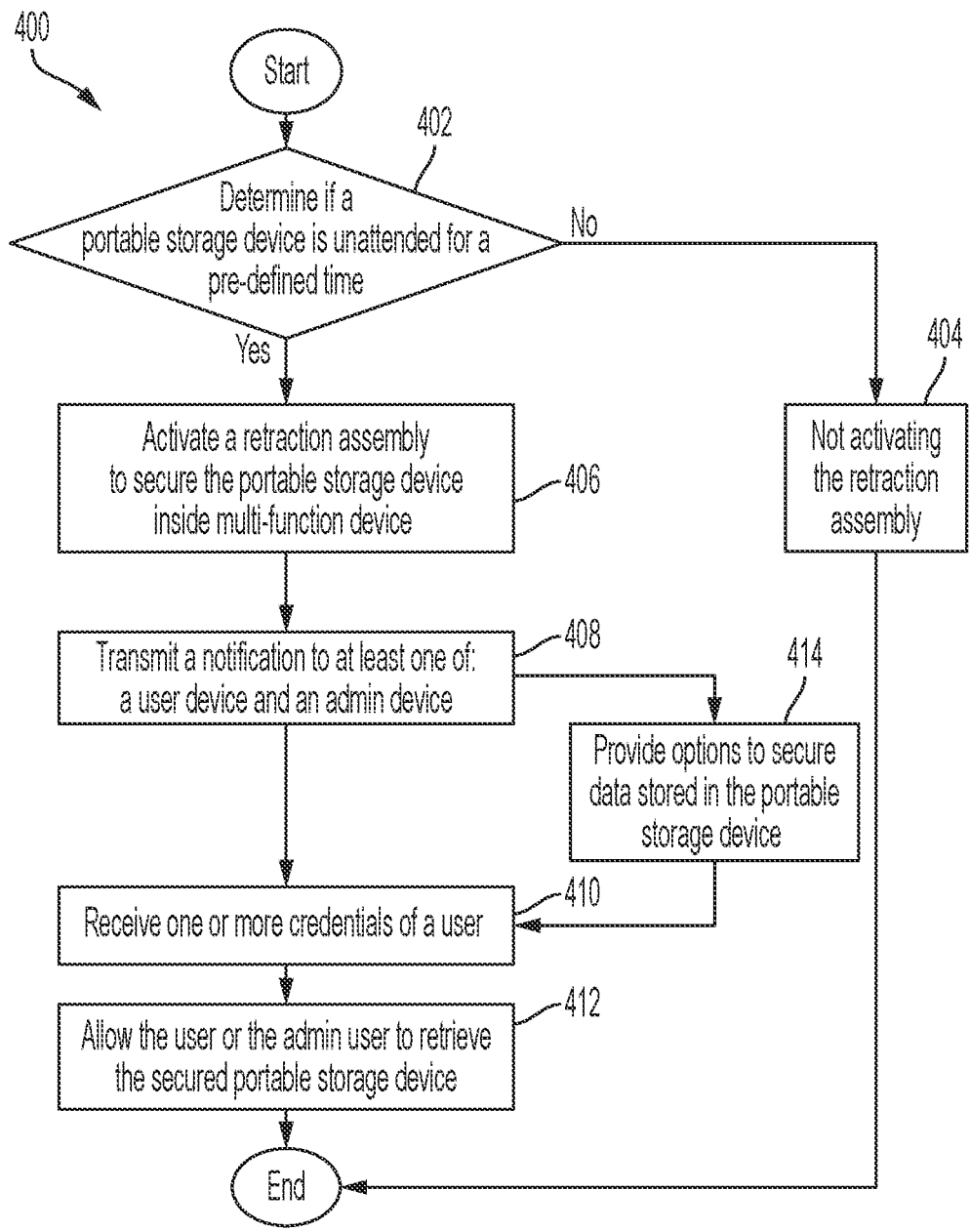
FIG. 4 is an overall method for securing the portable storage device connected to the USB port of the multi-function device, according to an embodiment of the present disclosure.

FIG. 4 is an overall method flowchart 400 for securing a portable storage device such as USB 112 connected to a USB port 110 of the multi-function device 102. The method 400 can be implemented at a multi-function device, a printer, a scanner or any device with printing and/or scanning functionality along with a USB feature. For example, the method 400 can be implemented at the multi-function device 102 or a printer when the user wants to print one or more documents as stored in the USB 112. In another example, the method 400 can be implemented at a multi-function device or a scanner when the user wants to scan one or more documents and store scanned documents in the USB 112.

In operation, the method 400 begins when the user wishes to print a document as stored in the USB 112. The user connects the USB 112 to the USB port 110 and gives a print command at the mufti-function device 102. The selected document is printed at the multi-function device 102.

At 402, it is determined if the USB 112 is unattended at the mufti-function device 102 for the pre-defined time. If it is determined that the USB 112 is unattended at the multi-function device 102 for the pre-defined time, the method 400 proceeds forward with implementing other blocks 406, 408 and so on. Otherwise, the retraction assembly is not activated (as indicated by 404) and the method 400 proceeds with conventional ways.

At 406, the retraction assembly 104 is activated to secure the USB 112 inside multi-function device 102. The retraction assembly 104 retracts the USB 112 inside the multi-function device 102 as discussed above in detail.

Once successfully retracted, at 408, a notification is sent to the user and/or an admin user of the multi-function device 102. The notification may include an image, a message, a webpage link, or a combination thereof. The user may select the webpage link given in the notification to secure data (e.g., documents) stored in the USB 112. At 414, in response to the user selecting the webpage link 316, the user is provided with options to secure the data stored in the USB 112. For example, the user may be provided with a first option (e.g., option 318a) and a second option (e.g., option 318b). The user may select the first option to upload the data stored in the USB 112 to a cloud storage of the user and delete the data from the USB 112. Alternatively, the user may select the second option to delete the data from the USB 112.

The notification is sent to notify the user and/or the admin user to retrieve the USB 112 from the multi-function device 102. At 410, one or more credentials of a user are received at the multi-function device 102. Here, the user may be the user of the USB 112 or an admin user. At 412, based on matching of the input user credentials, the user and/or the admin user is allowed to retrieve the secured USB 112 from the multi-function device 102.

This way, the method 400 successfully secures the USB 112 for later retrieval and/or access and further allows the user to retrieve the USB 112.

Figure 5:
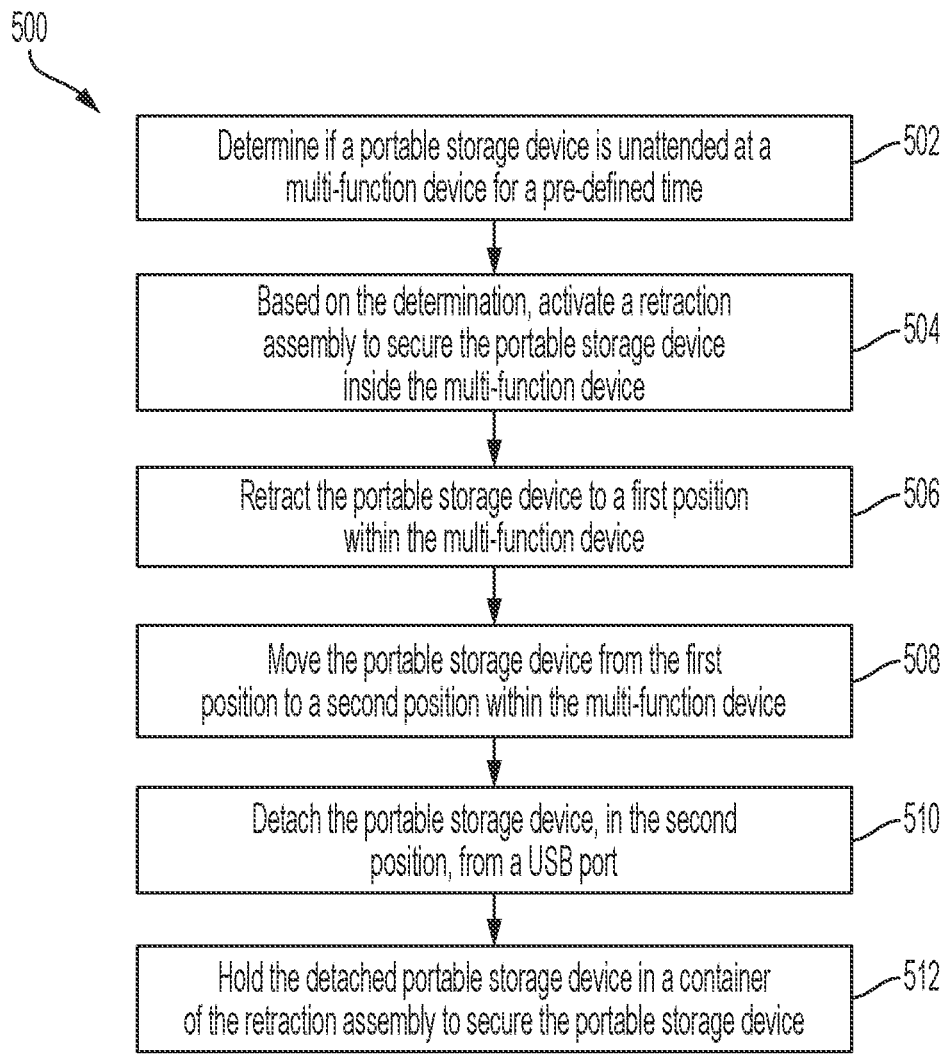
FIG. 5 is a detailed flowchart for securing the portable storage device connected to the USB port of the multi-function device, according to an embodiment of the present disclosure.

FIG. 5 is a detailed method flowchart 500 for securing a portable storage device such as the USB 112 connected to the multi-function device 102. At 502, the method 500 includes determining if the USB 112 is unattended at the multi-function device 102 for the pre-defined time. Further, at 504, based on the determination, the retraction assembly 104 is activated to secure the USB 112 inside the multi-function device 102. Once activated, multiple components of the retraction assembly 104 are activated and starts functioning.

At 506, the USB 112 is retracted to a first position within the multi-function device 102. Then at 508, the USB 112 is moved from the first position to a second position within the multi-function device 102. At 510, the USB 112 is detached, in the second position, from the USB port 110.

At 512, the detached portable storage device is held in the container 222 to secure the USB 112. Finally, the container 222 holding the detached portable storage device is moved to a cover covering an opening of the retraction assembly 104. Here, the container is moved (using the fourth actuator) to an opening covered by a cover such that the container is closed using the cover.

This way, the unattended USB 112 is successfully secured at the multi-function device 102. At the time of retrieval, the cover that covers is opened to allow the user to retrieve the USB 112 from the container 222 via the opening of the retraction assembly 104. For example, at the time of retrieval, the user requires to input his credentials such as username, password, user ID or the like. Upon successful matching of the credentials, the fifth actuator is controlled to open the cover to allow the user to retrieve the portable storage device from the container via the opening of the retraction assembly 104. Similarly, the admin user can retrieve the USB 112.

The method 500 includes capturing an image of the USB using an image sensor inside the container. The captured image of the USB 112 can be sent in the form of a notification for easy identification of the USB 112 by the user and/or by the admin user.

The present disclosure discloses a retraction assembly associated with a multi-function device for securing a portable storage device connected to a Universal Serial Bus (USB) port of the multi-function device. The retraction assembly includes one or more actuators for moving the attached portable storage device from the outside of the multi-function device to the inside of the multi-function device. For example, the actuators retract the portable storage device to a first position within the multi-function device. The actuators then move the portable storage device from the first position to a second position within the multi-function device, detach the portable storage device in the second position from the USB port and store the detached portable storage device. The retraction assembly further includes a container for holding the detached portable storage device to secure the portable storage device inside the multi-function device. This way, the portable storage device is secured.

The retraction assembly is activated based on a command. The command can be an automatic command or user's input-based command. The command can be from the controller of the multi-function device. For example, when the controller determines or identifies that the portable storage device is left unattended at the multi-function device intentionally or unintentionally by a user, the command can be initiated to activate the assembly by the controller itself. The command can be considered based on an input from the user. For example, the user may have some urgent work and wants to resume/continue printing after some time. In such cases, the user can submit his input to the controller to secure the portable storage device through the user interface. As a result, the retraction assembly is activated to secure the portable storage device inside the multi-function device. These are just few examples, but the retraction assembly can be activated when the portable storage device needs to be secured at the multi-function device.

The present disclosure discloses methods and systems for securing portable storage device communicatively coupled to devices such as multi-function devices, scanner, printers, multi-function printers and so on. The methods and systems retract the portable storage device inside a tray/container in the mufti-function device. The methods and systems lock the portable storage device within the device when left unattended. The methods and systems control loss of data and further secures confidential information for the user and/or to the organization. The methods and systems improve security for the user and/or the portable storage device when the device is left unattended by mistake or because of other known/unknown circumstances.

The present disclosure provides an advanced level of security for the portable storage device in a scenario where the portable storage device is left unattended by the user.

Since the unattended portable storage device is retracted into the multi-function device, the unattended portable storage device is secured from theft by other persons. Consequently, not only the portable storage device is secured, but also data (e.g., documents) stored in the portable storage device is secured. Additionally, post retraction of the portable storage device into the mufti-function device, a notification is sent to the user to notify that the portable storage device is secured. Therefore, the embodiments of the present disclosure secure the portable storage device and subsequently notify the user.

Although the disclosure is discussed with respect to scenarios when the user uses the portable storage device for printing the documents. But the disclosure can be implemented for other scenarios. For example, the user uses the portable storage device for storing one or more documents after scanning. There are chances that the user may forget his portable storage device at the multi-function device. In such scenarios, the methods and systems can be implemented.

For a person skilled in the art, it is understood that the use of phrase(s) "is", "are", "may", "can", "could", "will", "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "securing" or "printing" or "scanning" or "moving" or "displaying" or "sending" "or transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims

What is claimed is:

1. A system for securing a portable storage device connected to a Universal Serial Bus (USB) port of a mufti-function device, the system comprising:
   the portable storage device connected to the USB port of the mufti-function device, comprising one or more documents for printing or one or more scanned documents post scanning activity at the mufti-function device; and
   a controller for:
      determining if the portable storage device is unattended at the multi-function device for a pre-defined time; and
      based on the determination, activating a retraction assembly to retract the portable storage device into the multi-function device to secure the portable storage device, wherein the retraction assembly is communicatively coupled to the controller.

2. The system of claim 1, wherein the retraction assembly comprises:
   a first actuator for retracting the portable storage device to a first position within the multi-function device;

a second actuator for moving the portable storage device from the first position to a second position within the multi-function device;

a third actuator for detaching the portable storage device, in the second position, from the USB port; and a container for holding the detached portable storage device to secure the portable storage device.

3. The system of claim 1, wherein the container comprises an image sensor for capturing an image of the portable storage device held in the container.

4. The system of claim 1, wherein the controller is for transmitting a notification to at least one of: a user device associated with a user of the portable storage device, and an admin device associated with an admin of the multi-function device.

5. The system of claim 4, wherein the controller is for:
transmitting a webpage link to the user device; and
based on selection of the webpage link, providing one or more options to secure data stored in the portable storage device.

6. The system of claim 5, wherein the one or more options comprise:
a first option for uploading the data stored in the portable storage device to a cloud storage and deleting the data from the portable storage device; and
a second option for deleting the data from the portable storage device.

7. The system of claim 1, wherein the container is attached to a container guide.

8. The system of claim 7, wherein the retraction assembly further comprises:
a cover for covering an opening of the retraction assembly; and
a fourth actuator for moving, based on the container guide, the container holding the detached portable storage device to the opening of the retraction assembly such that the container is closed using the cover.

9. The system of claim 8, wherein the retraction assembly further comprises a fifth actuator for opening the cover.

10. The system of claim 9, wherein the controller is for:
receiving one or more credentials from at least one of: a user of the portable storage device and an admin user; and
based on the one or more credentials, controlling the fifth actuator to open the cover to allow the at least one of: the user and the admin user, to retrieve the portable storage device from the container via the opening of the retraction assembly.

11. A method for securing a portable storage device connected to a Universal Serial Bus (USB) port of a multi-function device, the method comprising:
determining if the portable storage device is unattended at the multi-function device for a pre-defined time, after a pre-defined activity is completed at the multi-function device;
based on the determination, activating a retraction assembly to secure the portable storage device inside the multi-function device, wherein the retraction assembly at least comprises a container; and
executing a retraction process such that the portable storage is detached from the USB port to the container of the retraction assembly, thereby securing the portable storage device inside the multi-function device.

12. The method of claim 11, wherein the retraction process comprises:
retracting the portable storage device to a first position within the multi-function device;
moving the portable storage device from the first position to a second position within the multi-function device;
detaching the portable storage device, in the second position, from the USB port; and
holding the detached portable storage device in the container to secure the portable storage device.

13. The method of claim 11, further comprising, moving the container to an opening covered by a cover such that the container is closed using the cover.

14. The method of claim 11, further comprising, capturing an image of the portable storage device held in the container.

15. The method of claim 11, further comprising, transmitting a notification to at least one of: a user of the portable storage device, and to an admin user of the multi-function device.

16. The method of claim 11, further comprising, transmitting a webpage link to a user device.

17. The method of claim 16, further comprising, based on selection of the webpage link, providing one or more options to secure data stored in the portable storage device.

18. The method of claim 11, further comprising, allowing a user or an admin user to retrieve the portable storage device from the container based on respective credentials of the user or of the admin user.

19. A retraction assembly associated with a multi-function device for securing a portable storage device connected to a Universal Serial Bus (USB) port of the multi-function device, the retraction assembly comprises:
one or more actuators for:
retracting the portable storage device to a first position within the multi-function device;
moving the portable storage device from the first position to a second position within the multi-function device; and
detaching the portable storage device, in the second position, from the USB port; and
a container for holding the detached portable storage device to secure the portable storage device inside the multi-function device.

20. The retraction assembly of claim 19 is activated based on a command.

* * * * *